United States Patent
Peinelt et al.

(10) Patent No.: US 7,264,032 B2
(45) Date of Patent: Sep. 4, 2007

(54) IMPROPER WORKING POSITION DETECTION FOR TIRE MOUNTING APPARATUS AND METHOD

(75) Inventors: Andreas Peinelt, Pfungstadt (DE); Werner Lehr, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 165 days.

(21) Appl. No.: 11/209,481

(22) Filed: Aug. 22, 2005

(65) Prior Publication Data

US 2006/0037712 A1 Feb. 23, 2006

(30) Foreign Application Priority Data

Aug. 23, 2004 (DE) .................. 10 2004 040 866

(51) Int. Cl.
*B60C 25/135* (2006.01)
*B60C 25/12* (2006.01)
*B60C 25/132* (2006.01)
*B60C 25/122* (2006.01)

(52) U.S. Cl. .................. 157/1.22; 157/1.25; 157/1.21; 157/1.2

(58) Field of Classification Search ........ 157/1.1–1.33, 157/1.44, 14

See application file for complete search history.

(56) References Cited

U.S. PATENT DOCUMENTS 4,800,944 A 1/1989 Kane
6,125,904 A 10/2000 Kane et al.
6,173,751 B1 1/2001 Magnani
2005/0241776 A1* 11/2005 Gonzaga ............... 157/1.17

FOREIGN PATENT DOCUMENTS

| DE | 28 29 936 | 1/1980 |
| DE | 696 11 143 | 7/2003 |
| DE | 102 22 164 | 10/2003 |
| EP | 0 767 098 | 7/2003 |
| JP | 06270619 A * | 9/1994 |

OTHER PUBLICATIONS

" Balancing and Diagnostic Systems", 2002 Catalog RA 1020e of Company Schenck RoTec GmbH, Landwehrstr. 55, D-64293 Darmstadt, Germany, pp. 116 to 117 (2002).

* cited by examiner

*Primary Examiner*—Joseph J. Hail, III
*Assistant Examiner*—Bryan R. Muller
(74) *Attorney, Agent, or Firm*—W. F. Fasse; W. G. Fasse (57) ABSTRACT

An apparatus for mounting a tire on a wheel rim includes a mounting head with a tire bead deflector and a tire press-in roller, and a drive that moves the mounting head toward, and rotates the bead deflector and the press-in roller around, the wheel rim. To avoid a damage-causing contact between the bead deflector and the wheel rim, an arrangement for monitoring a minimum spacing distance between the wheel rim and the mounting head is arranged preferably on the bead deflector. If an improper working position closer than the minimum spacing distance is detected, the arrangement produces a signal that influences, e.g. stops, the motion of the mounting head. The arrangement preferably includes a contact member of a comparatively soft low-friction material at a working end of the bead deflector. If the contact member contacts the wheel rim, this actuates a piezoelectric element to generate the required electrical signal.

20 Claims, 2 Drawing Sheets

IMPROPER WORKING POSITION DETECTION FOR TIRE MOUNTING APPARATUS AND METHOD

PRIORITY CLAIM

This application is based on and claims the priority under 35 U.S.C. §119 of German Patent Application 10 2004 040 866.1, filed on Aug. 23, 2004, the entire disclosure of which is incorporated herein by reference.

FIELD OF THE INVENTION

The invention relates to a method and an apparatus for mounting a tire onto a rim of a vehicle wheel, using a tire mounting head with a bead deflector and a press-in roller as well as a drive for rotating the mounting head about the wheel rim axis and for axially moving the mounting head.

BACKGROUND INFORMATION

A tire mounting apparatus and method of the above mentioned general type are known from the company catalog "Balancing and Diagnostic Systems", 2002 Catalog RA 1020e of the company Schenck RoTec GmbH, of Landwehrstrasse 55, D-64293 Darmstadt, Germany. At pages 116 and 117, the English version of the mentioned catalog discloses a tire mounting or assembly machine for vehicle wheels, whereby the tire is at first laid sloping obliquely onto the wheel rim of a vehicle wheel to begin the tire mounting process. The lower tire bead of the tire is partly located within the recessed deep well of the rim, and partly protrudes outwardly above the upper rim flange. To carry out the tire mounting process, the wheel rim is supported and tightly held or clamped, and the tire mounting head (also called a draw-down head or pull-on head) is lowered until the bead deflector and the press-in or press-down roller contact the side of the tire. Then the mounting head is rotated about the rim axis. The bead deflector pushes against and along the tire bead to ensure that the tire bead lies radially outwardly relative to the rim flange, and then the following press-in roller axially presses the tire bead downwardly into the deep recessed well of the wheel rim, while simultaneously the lower tire bead is pressed into contact against the lower rim flange. The mounting of the two tire beads onto the rim can be carried out, as desired, either together in common in one operation, or sequentially in two rotations of the mounting head. The mounting head is adjustable to various different wheel rim types, e.g. different rim diameters, rim widths, or rim profiles or shapes. The adjustment can be achieved automatically in connection with a preceding rim type recognition.

In practice, it has been found that the rim type recognition can give incorrect rim type identifying data, for example due to a malfunction or various type-recognition errors. Errors can also arise due to interference in the transmission of the type identifying data from the type recognition arrangement to the tire mounting apparatus. Still further errors can arise during the automatic or manual adjustment of the bead deflector and/or the press-in roller, as well as the drive movements of the mounting head. If the wheel rim is clamped on the rim support in an uncentered or tilted manner, it gives rise to further positioning errors.

The above mentioned errors can cause an improper working position of the bead defector and/or the press-in roller relative to the particular wheel rim being processed. In a worst case situation, such improper working position can cause the bead deflector to collide with, gouge into, or scrape along the wheel rim flange, or excessively deflect the tire bead, and thereby damage the wheel rim and/or the tire. Since the contact of the bead deflector with the wheel rim flange occurs on the visible decorative side of wheel rim, even the slightest visible damage leads to rejection of the wheel rim, or damage of the tire leads to rejection of the mounted tire-rim combination, in subsequent quality control. Furthermore, any damage to the rim flange or the tire bead can make it impossible to properly and successfully mount the tire on the rim. The equipment itself, e.g. the bead deflector, can also become damaged by improperly contacting and pressing against the rim flange.

SUMMARY OF THE INVENTION

In view of the above, it is an object of the invention to improve a tire mounting apparatus and method of the above mentioned general type in such a manner so as to ensure the trouble free performance of the tire mounting process, even for a succession of wheel rims of different types or sizes. A further object of the invention is to avoid damage to the tire, rim or equipment due to an improper working position and especially contact between the bead deflector and the wheel rim flange. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in an apparatus for mounting a tire on a wheel rim of a vehicle wheel, comprising a wheel rim support, a tire mounting head and a drive arrangement. The wheel rim support supports the wheel rim. The tire mounting head includes a tire bead deflector that deflects a tire bead of the tire around a wheel rim flange of the wheel rim, and a tire press-in roller that presses the tire bead into a rim well of the wheel rim. The drive arrangement is connected to the tire mounting head and drives the tire mounting head rotationally about a wheel rim axis of the wheel rim and axially toward and away from the wheel rim along the wheel rim axis. According to the invention, the apparatus further comprises detecting and signaling means, arranged on the tire mounting head, for detecting an existence or non-existence of at least a prescribed minimum spacing distance between the tire mounting head and the wheel rim, and for providing to the drive arrangement a signal that is responsive to the detection and that influences the driving of the tire mounting head by the drive arrangement.

The above objects have further been achieved according to the invention in an apparatus for mounting a tire on a wheel rim of a vehicle wheel, comprising a wheel rim support, a tire bead deflector, a drive arrangement, a controller connected to the drive arrangement to control the operation thereof, a contact member configured and arranged on the tire bead deflector so as to come into contact with the wheel rim flange in the event of an improper working position of the tire bead deflector relative to the wheel rim, and a signaling arrangement. In the improper working position, the tire bead deflector fails to maintain at least a prescribed minimum spacing distance between the tire bead deflector and the wheel rim. The signaling arrangement is connected to and actuated by the contact member, and is connected for signal transmission to the controller. The signaling arrangement provides to the controller a signal in response to the contact member coming into contact with the wheel rim, and the controller controls the drive arrangement in response to the signal.

Still further, the above objects have also been achieved according to the invention in a method of mounting a tire on a vehicle wheel rim, comprising steps of supporting and securely holding the wheel rim, positioning the tire partly on the wheel rim, moving a tire mounting head including a tire bead deflector axially toward the wheel rim, rotating the tire mounting head to rotate the tire bead deflector around a wheel rim flange of the wheel rim so that the tire bead deflector deflects a tire bead of the tire around the wheel rim flange, and pressing the tire bead into a rim well of the wheel rim. During the steps of moving and rotating the tire mounting head, the method further involves monitoring whether an actual spacing distance between the tire mounting head and the wheel rim is at least equal to a prescribed minimum spacing distance. If the actual spacing distance falls below the prescribed minimum spacing distance, then a signal is produced. In response to the signal, the moving and/or the rotating of the tire mounting head is influenced (for example stopped).

Advantageously, the invention provides that an improper working position between the tire mounting head and the wheel rim possibly arising before or even during the tire mounting process is detected and produces a signal that suitably influences the tire mounting process. For example, the tire mounting process is not started, or the already-started tire mounting process is interrupted and the apparatus is stopped, or the tire mounting head is repositioned relative to the wheel rim. The improper working position of the mounting head, and especially the bead deflector thereof, relative to the wheel rim can arise from any of the above mentioned errors, such as errors in the wheel rim type recognition or in the transmission of the type identifying data, or errors in the adjustment of the bead deflector or the press-in roller, or errors in the support and clamping of the wheel rim. The invention provides simple means to ensure that such in improper working position does not lead to damage of the wheel rim or the tire, for example because the further operation of the tire mounting apparatus is immediately stopped if any such improper working position is detected. Then, an operator of the apparatus can determine the cause of the problem, and carry out any suitable readjustment or repositioning (for example repositioning and reclamping the wheel rim, or readjusting the position of the bead deflector or the press-in roller especially regarding the axial positions thereof). Thereafter the tire mounting process can be started or continued, without having caused any damage to the tire or the rim. Thereby the reject rate can be significantly reduced.

It is also advantageous that the invention does not require complex or costly additional devices, because the position or spacing detection arrangement is preferably incorporated into the existing bead deflector in a simple manner. An especially advantageous further embodiment provides a wireless signal transmission from the position detection arrangement of the bead deflector to the drive arrangement or the controller thereof. Thereby a hard-wired cable connection can be omitted, although an alternative embodiment uses a hard-wired transmission of an electrical signal through an electrical cable connection or of an optical signal through an optical fiber connection. Such cable connections can be problematic and subject to interference or breakdown in the actual production process, especially if the cables must undergo rapid movements in operation, in this case the axial and circular or rotational movements of the tire mounting head. The preferred wireless transmission according to the invention preferably is carried out as a radio transmission (e.g. radio frequency RF transmission), but alternatively may be carried out as an optical transmission (e.g. an infrared IR transmission).

In a structurally simple preferred embodiment of the invention, a suitable position detection element is incorporated into or arranged on an end surface of the bead deflector that faces toward or cooperates with the wheel rim flange. In a particularly simple and robust embodiment, the position detection element is a contact member or especially a switching feeler shoe of a switching arrangement. When the switching shoe contacts the wheel rim flange, the switching shoe is displaced through a switching displacement, and in turn displaces a switching pushrod connected thereto, so that the pushrod is slidingly displaced against a return spring force, and in turn activates a switch that is preferably embodied as a piezoelectric switch. This piezoelectric switch includes a switching mechanism as well as a piezoelectric crystal element that serves as an energy source. Since the piezoelectric effect is used for supplying the necessary energy for the position detection signal, it is not necessary to provide any external energy source or any other internal energy source such as a primary or secondary battery in the bead deflector. The piezoelectrically generated energy can also be used for carrying out the wireless transmission of the resulting signal, i.e. for powering the signal transmitter.

A gentle handling or treatment of the tire is ensured by a further embodiment in which the working end surface of the bead deflector comprises a first surface section that extends perpendicularly to the axis of the bead deflector, and a second surface section that protrudes away obliquely at a slope or tilt angle from the first surface section. Preferably, the second surface section is oriented to slope obliquely away from the first surface section at an angle of 45°.

The switching shoe of the position detection arrangement preferably has a similar configuration as the working end surface of the bead deflector, with two portions thereof respectively partially recessed into a groove along the first surface section and the second surface section of the working end surface of the bead deflector. With such an embodiment, the wheel rim flange will contact the obliquely sloping surface of the switching shoe for either (or both) a radial improper working position and/or an axial improper working position of the bead deflector relative to the wheel rim. In other words, if the bead deflector is improperly radially positioned, or improperly axially positioned, relative to the wheel rim flange, then the rim flange will contact the sloping surface of the switching shoe so as to cause an axial displacement of the switching push rod in the axial direction and thereby cause an operation of the switching arrangement, to generate a signal indicative of the existence of the improper position in which the prescribed minimum spacing distance is not being maintained. That signal is transmitted to the controller and/or drive of the tire mounting head, so as to stop or interrupt the motion of the mounting head, or even to readjust the position of the mounting head in an automatic responsive manner.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF A PREFERRED EXAMPLE EMBODIMENT AND OF THE BEST MODE OF THE INVENTION

Figure 1:
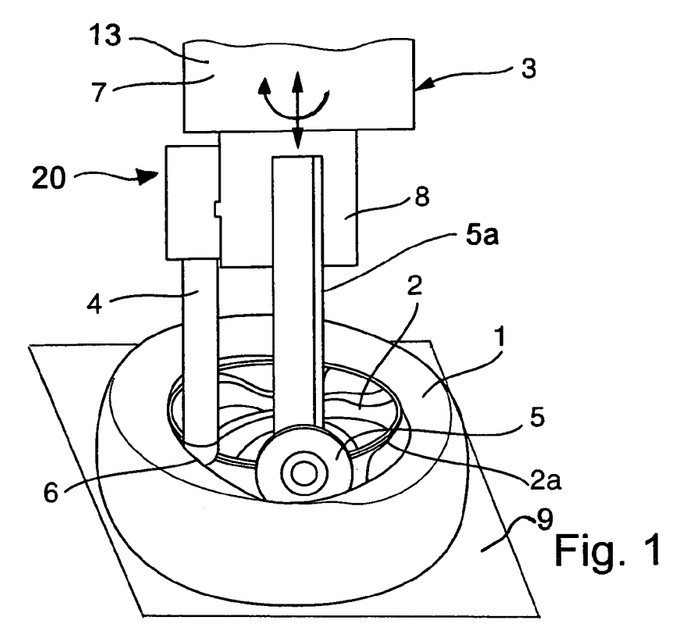
FIG. 1 is a simplified schematic perspective view of an inventive apparatus.

FIG. 1 schematically illustrates an apparatus for mounting a tire 1 onto a wheel rim 2 of a vehicle wheel. The tire mounting apparatus is arranged and supported in a machine frame or tire mounting station, of which the further components are not shown. The wheel rim 2 is supported on a wheel support platform 9, which is schematically indicated, and which includes any conventionally known wheel holding or clamping device. The wheel rim 2 is thus fixedly secured and held in the horizontal position on the wheel support platform 9 by the wheel rim clamping device (not shown in detail) thereof.

Above the wheel rim 2, the tire mounting or draw-down head 3 of the tire mounting apparatus is movably arranged on the machine frame so that the rotation axis of the tire mounting head 3 coincides with the vertical wheel rim axis of the wheel rim 2. More particularly, the mounting head 3 is connected to and supported by a drive arrangement 13 so as to be rotatable by at least one rotation about the vertical axis and to be displaceable in a stepless stroke manner in the axial direction, as respectively indicated by the two motion arrows. Thus, the drive arrangement 13 includes a rotational drive mechanism and a linear stroke drive mechanism, which may, for example, be operated electrically (e.g. an electric motor) and/or via a suitable pressure medium (e.g. a hydraulic motor or piston-cylinder device). Also, the drive arrangement 13 is connected to or integrated with a control arrangement 7, which controls the operation of the drive arrangement 13.

To carry out a tire mounting process, i.e. to press a respective tire 1 onto a respective matching wheel rim 2, the drive 13 drives the mounting head 3 vertically into a (nominally proper) axially spaced position relative to the wheel rim 2, and then drives the mounting head 3 rotationally to carry out at least one full rotation, to mount the tire as will be explained below. In this regard, the mounting head 3 must be properly positioned and especially axially adjusted by the drive arrangement 13 under the control of the control arrangement 7, dependent on the axial position of the wheel rim side face of the respective wheel rim 2 positioned in the mounting station. Thus, if successive wheel rims have different sizes, profiles, or types, then the mounting head 3 will have to be appropriately positioned to different axial positions respectively proper for the respective different wheel rims. For this purpose, the control arrangement 7 can receive signals from a preceding type-recognition arrangement for recognizing and identifying the different types or sizes of wheel rims and/or tires. The control arrangement 7 can also receive manual information through any suitable operator input arrangement, such as a keyboard or adjustment switches, to identify the wheel rim and tire type to be processed at any given time. The control arrangement 7 then properly controls the drive arrangement 13 so as to position the working components of the mounting head 3 properly relative to the wheel rim 2 and the tire 1.

The working tools of the tire mounting head 3 include a tire bead deflector or bead folder 4 and a tire press-in or press-down roller 5. The mounting head 3 may comprise a plurality of press-in rollers. The bead deflector 4 and the press-in roller are secured to an adapter part 8 of the mounting head 3 in such a manner so that their respective positions in the radial direction are adjustable for the purpose of accommodating or adapting to various different wheel rim and tire diameters.

The press-in roller 5 is rotatably supported by a support arm 5a, which in turn is releasably or removably secured to the adapter part 8. The rotation axis of the press-in roller 5 extends essentially perpendicularly to the wheel rim axis (and correspondingly the rotation axis of the mounting head 3). Thus, as the mounting head 3 rotates around the wheel rim axis, the press-in roller 5 rolls along the sidewall of the tire 1, whereby the roller 5 presses the sidewall of the tire 1 down below the wheel rim flange 2a as will be discussed further below. In this regard, the press-in roller 5 is arranged behind or after the tire bead deflector 4 in the rotation direction of the mounting head 3.

The tire bead deflector 4 is configured essentially cylindrically, i.e. as a cylindrical rod, and comprises a working section 4a that is to be pressed against the tire bead 6, a securing section 4b that secures the bead deflector 4 to the adapter part 8, and a middle section 4c extending between the working section 4a and the securing section 4b. The working section 4a comprises an end surface 10 that includes a first surface section 10a extending along a plane normal or perpendicular to the axis of the bead deflector 4, and a second surface section 10b extending obliquely or sloping relative to the first surface section 10a, and especially extending at a slope angle of about 45° (e.g. 40° to 50°) relative to the axis, and sloping outwardly away from the first surface section 10a. This configuration can especially be seen in the side view of FIG. 2 (further in connection with the front view of FIG. 3).

A groove 11 extends linearly crosswise or transversely through the middle of the end surface 10. In this regard, the groove 11 extends from the circumference of the working section 4a of the bead deflector 4 in the area of the first surface section 10a to shortly before (i.e. displaced inwardly from) the circumference of the working section 4a in the area of the second surface section 10b. In other words, while the groove has an open end at the circumference of the working section 4a on the first surface section 10a, it does not penetrate through the circumference and thus has a closed end at the circumference of the second surface section 10b. This side of the circumferential surface 12 of the bead deflector 4 (adjacent to the second surface section 10b) is allocated to, faces toward and presses against the tire bead 6, while the end surface 10 including the surface sections 10a and 10b is allocated to and faces toward the wheel rim flange 2a (see FIG. 4).

Figure 2:
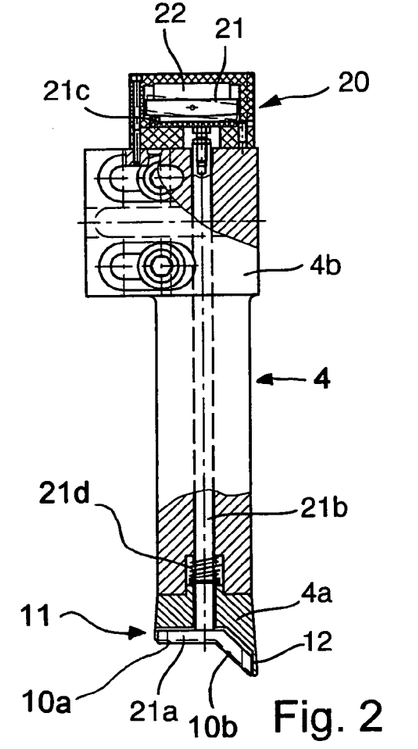
FIG. 2 is a partially sectioned side view of the bead deflector with a position detector and signaling device of the inventive apparatus of FIG. 1.
Figure 3:
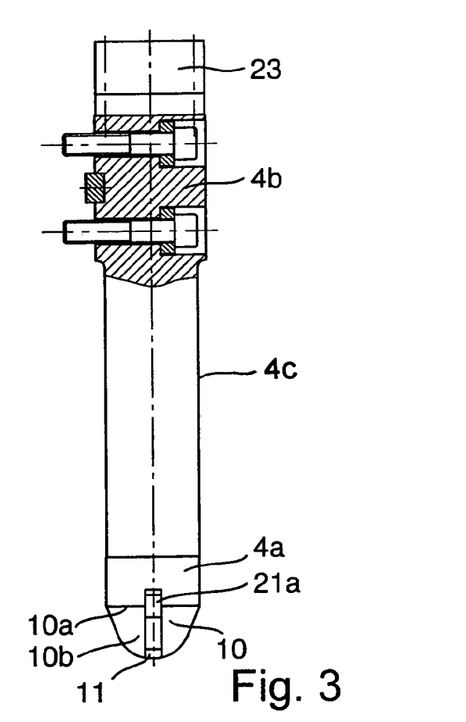
FIG. 3 is a partially sectioned front view of the bead deflector of FIG. 2.

The tire bead deflector 4 further comprises a signaling device or arrangement 20, which generates or releases a signal that is indicative of a relative position (or spacing) of the bead deflector 4 with respect to the wheel rim flange 2a, and that is provided to the control arrangement 7 and/or the drive arrangement 13 to influence the motion of the tire mounting head 3. The signaling device 20 comprises a switching arrangement 21, an energy source 22, and a signal transmitter 23, which is preferably a wireless (e.g. RF or IR) transmitter, but may alternatively be a hardwired transmitter. The signal transmitter 23 (preferably wirelessly) transmits the signal to the drive arrangement 13 and/or the control arrangement 7 for influencing, especially for stopping, the drive arrangement. The significance of this will be discussed further below. In this regard, the transmitter 23 is connected for signal transmission to the drive arrangement 23 and/or the control arrangement 7, e.g. by an RF wireless transmission link, an IR wireless transmission link, a wire, an optical fiber, or other signal transmission link.

The switching arrangement 21 comprises a switching feeler shoe or foot 21a, a switching pushrod 21b connected to and actuated by the switching shoe 21a, and a switch mechanism 21c that is acted on and actuated by the switching pushrod 21b. The switching shoe 21a consists of a material with a significantly lower hardness than the material of the wheel rim 2, and with good sliding or anti-friction characteristics. The terms anti-friction and low-friction mean exhibiting a lower coefficient of friction than steel sliding against steel. For example, the switching shoe 21a may be made of any one of various low-friction plastic materials such as polytetrafluoroethylene (PTFE). Thus, if the switching shoe 21a comes into contact with the wheel rim 2 and particularly the wheel rim flange 2a, then the switching shoe 21a can easily slide along the rim flange 2a without causing any damage thereto. The switching shoe 21a thereby forms a device or arrangement for detecting the existence or non-existence of a minimum spacing distance between the wheel rim 2 and the tire mounting head 3, particularly the bead deflector 4 of the mounting head 3, whereby the prescribed minimum spacing distance is given by the protrusion distance of the switching shoe 21a beyond the end surface 10 of the bead deflector 4.

The switching shoe 21a is configured and dimensioned so as to fit into the groove 11 provided in the end surface 10 of the bead deflector 4. In this regard, a biasing spring, such as a compression spring 21d, acting on the switching pushrod 21b biases the switching shoe 21a to protrude outwardly from the groove 11, but the switching shoe 21a can be pressed against the spring force to be partly received or recessed in the groove 11. The switching shoe 21a has a contour shape that is matched to the shape of the end surface 10, i.e. including an angled profile having two shoe portions extending at an oblique angle relative to one another respectively along the first surface section 10a and the second surface section 10b.

Figure 4:
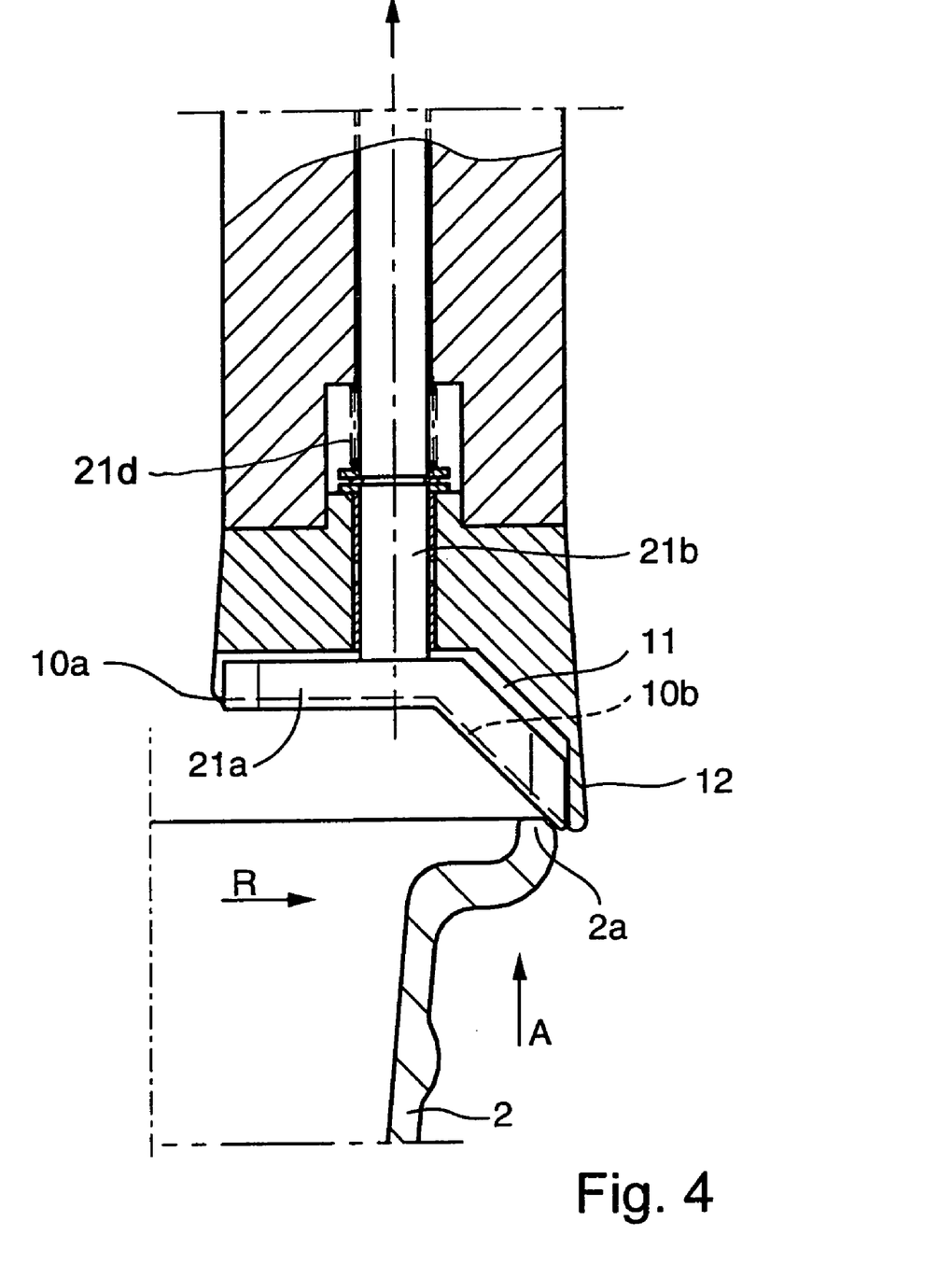
FIG. 4 is an enlarged sectional detail view of the working end portion of the bead deflector according to FIG. 2.

During the axial and/or radial positioning and motion of the mounting head 3 and especially the bead deflector 4 relative to the wheel rim 2, if the minimum spacing distance between the mounting head 3 (especially the bead deflector 4 thereof) and the wheel rim 2 is no longer maintained, then the wheel rim flange 2a will contact a sloping surface of the switching shoe 21a as shown in FIG. 4. Such contact of the wheel rim flange 2a with the sloping surface of the switching shoe 21a will arise for both improper radial positions (as indicated by the arrow R in FIG. 4) as well as improper axial positions (as indicated by the arrow A in FIG. 4) of the wheel rim flange 2a relative to the bead deflector 4 (or vice versa). In any event, either an improper radial positioning R or an improper axial positioning A of the rim flange 2a contacting the switching shoe 21a will result in an axial displacement of the switching shoe 21a to be recessed into the groove 11, which in turn causes an axial pushing displacement of the switching pushrod 21b against the spring force of the biasing spring 21d upwardly as indicated by the upward axial direction arrow at the top of FIG. 4. Thus, through the arrangement of two end surface sections 10a and 10b that are tilted relative to one another, the first surface section 10a (and its associated portion of the switching shoe) can detect a height impact or deviation of the wheel rim 2, while the second surface section 10b (and its associated portion of the switching shoe) can detect an axial or radial impact or deviation of the wheel rim 2, respectively onto the associated portions of the switching shoe 21a.

As can be further understood in connection with FIG. 2, the upward sliding displacement of the switching pushrod 21b due to the upward recessing motion of the switching shoe 21a connected thereto is transmitted by the switching pushrod 21b axially through the bead deflector 4 and acts as a sliding displacement or stroke motion onto the switch mechanism 21c. The switching motion of the switch mechanism 21c in turn acts on a piezoelectric element provided as the energy source 21. In response to this mechanical switching actuation, the piezoelectric element or energy source 22 generates an electric signal, e.g. an electrical pulse, which is then transmitted by the transmitter 23 to the control arrangement 7 and/or the drive arrangement 13. In this regard, the electrical energy emitted by the actuated piezoelectric element 22 can also be used to power the transmitter 23, which is preferably a wireless transmitter 23.

In the illustrated preferred example embodiment, the switch mechanism 21c, the piezoelectric element or energy source 22, and the transmitter 23 are all arranged in common in a housing at the opposite or upper end surface of the bead deflector 4, i.e. at the upper end surface of the securing section 4b opposite from the working section 4a. Alternatively, however, the signaling device or arrangement 20 can be arranged at any other suitable or desired location of the mounting head 3. Also, as a further alternative, a force-dependent signaling arrangement can be provided instead of a displacement-dependent switching arrangement 21. As a further alternative, the signaling arrangement can be based on, and can release or trigger the transmission of a corresponding signal as a result of an electrical contact measurement of an electrical contact member or feeler contacting the wheel rim flange.

The process of mounting a tire 1 onto the wheel rim 2 of a vehicle wheel using the inventive tire mounting apparatus will now be described. First, the tire 1 is arranged over the wheel rim 2 in a sloping or tilted manner so that the tire bead 6 is partly located within the deep recessed well of the wheel rim 2 and partly protrudes above the upper wheel rim flange 2a. To carry out the tire mounting process, the wheel rim 2 is securely held or clamped onto the wheel support platform 9. The tire mounting apparatus has previously obtained appropriate data identifying the wheel rim dimensions and possibly also the tire dimensions of the tire and rim combination that is to be assembled or mounted. These data may be provided, for example, from a preceding automatic type-recognition arrangement, or from a manual input by an operator of the apparatus. In response to these data, the control arrangement 7 controls the drive arrangement 13 and any further actuators as necessary to adjust the components of the mounting head 3 to the proper tire and wheel dimensions, and then to lower the mounting head 3 axially by a prescribed displacement distance toward the wheel rim 2.

The tire mounting or assembling process begins in the area of the tire 1 in which the tire bead 6 lies approximately at the height of the wheel rim flange 2a. At the beginning of the mounting process, the end surface 10 of the bead deflector 4 of the mounting head 3 is positioned at a certain prescribed minimum spacing distance away from (e.g. above) the associated wheel rim flange 2a. Moreover, the bead deflector 4 is positioned so that the axially further protruding portion of the outer circumferential surface 12 thereof (adjacent to the second surface section 10b) presses against the tire bead 6 and thereby pushes the tire bead 6 radially outwardly beyond and around the edge of the rim flange 2a. As the mounting head 3 is rotated, the bead deflector 4 rotates around and along the edge of the wheel rim flange 2a and thereby guides the tire bead 6 radially outwardly along a circle around and over the edge of the wheel rim flange 2a, as the following press-in roller 5 then presses the tire bead 6 downwardly into the deep recessed well of the wheel rim 2. The tire mounting or assembling process is completed and ends when the mounting head 3 has carried out a 360° rotation.

If the actual spacing distance between the end surface sections 10a or 10b of the bead deflector 4 and the neighboring surface areas of the wheel rim flange 2a falls below the prescribed minimum spacing distance, during the initial lowering of the mounting head 3, i.e. especially the bead deflector 4, toward the wheel rim 2, or during the rotation of the mounting head 3 around the wheel rim axis, then the edge of the wheel rim flange 2a will come into contact with the switching shoe 21a, e.g. the obliquely sloping angular surface thereof, before or without coming into contact with the end surface 10 of the bead deflector 4 itself.

As soon as such a contact between the wheel rim flange 2a and the switching shoe 21a arises, the switching pushrod 21b is thereby pushed upwardly, whereby the signaling device 20 is activated and releases or generates a signal indicative of the detected improper working position of the bead deflector 4 relative to the wheel rim 2. This signal is transmitted to the control arrangement 7 and/or the drive arrangement 13, whereupon the lowering or the rotation of the mounting head 3 is stopped or interrupted.

The worker who is operating or monitoring the tire mounting apparatus can then determine and correct the cause of the improper working position (e.g. by readjusting components as needed, or by resetting the proper tire and wheel size data) before any damage has been caused to the wheel rim and/or the tire. For example, if the improper working position detection signal causes a stop of the initial lowering motion of the mounting head, this can be indicative of an error in the adjustment of the mounting head components or in the detection of the wheel rim dimensions. On the other hand, a signal-triggered stopping of the rotation process of the mounting head can be caused by a faulty uncentered clamping of the wheel rim 2 on the wheel support platform 9. As a further alternative, the generated improper working position detection signal can be used to automatically actuate a suitable corrective readjustment of the mounting head or its individual components relative to the wheel rim.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for mounting a tire on a wheel rim a of a vehicle wheel, comprising:
    a wheel rim support adapted to support the wheel rim;
    a tire mounting head including a tire bead deflector adapted to deflect a tire bead of the tire around a wheel rim flange of the wheel rim, and a tire pressin roller adapted to press the tire bead into a rim well of the wheel rim;
    a drive arrangement connected to said tire mounting head and adapted to drive said tire mounting head rotationally about a wheel rim axis of the wheel rim and axially toward and away from the wheel rim along the wheel rim axis; and
    arranged on said tire mounting head, a detector arrangement adapted to detect an existence or non-existence of at least a prescribed minimum spacing distance between said tire bead deflector and the wheel rim, and signaling means for providing to said drive arrangement a signal that is responsive to said detecting and that influences the driving of said tire mounting head by said drive arrangement;
    wherein said detector arrangement comprises a contact member configured and arranged on said tire bead deflector so as to come into contact with the wheel rim flange in the event of an improper working position of said tire bead deflector relative to the wheel rim, in which improper working position said tire bead deflector fails to maintain at lease said prescribed minimum spacing distance between said tire bead deflector and the wheel rim; and
    wherein said contact member protrudes by said prescribed minimum spacing distance from said tire bead deflector toward the wheel rim flange so as to be positioned to contact the wheel rim flange before any part of said tire bead deflector contacts the wheel rim flange.

2. An apparatus for mounting a tire on a wheel rim of a vehicle wheel, comprising:
    a wheel rim support adapted to support the wheel rim;
    a tire bead deflector adapted to deflect a tire bead of the tire around a wheel rim flange of the wheel rim;
    a drive arrangement connected to said tire bead deflector and adapted to drive said tire bead deflector rotationally about an axis and axially in an axial direction along or parallel to said axis toward and away from the wheel rim;
    a controller connected to said drive arrangement and adapted to control an operation of said drive arrangement;
    a contact member configured and arranged on said tire bead deflector so as to come into contact with the wheel rim flange in the event of an improper working position of said tire bead deflector relative to the wheel rim, in which improper working position said tire bead deflector fails to maintain at least a prescribed minimum spacing distance between said tire bead deflector and the wheel rim; and
    a signaling arrangement that is connected to said contact member so as to be actuated thereby, and that is connected for signal transmission to said controller, wherein said signaling arrangement is adapted to emit and provide to said controller a signal in response to said contact member coming into contact with the wheel rim, and said controller is adapted to control said drive arrangement in response to said signal;
    wherein said contact member protrudes by said prescribed minimum spacing distance from said tire bead deflector toward the wheel rim flanges so as to be positioned to contact the wheel rim flange before any part of said tire bead deflector contacts the wheel rim flange.

3. The apparatus according to claim 2, wherein said contact member is a mechanical contact member made of a low-friction plastic.

4. The apparatus according to claim 2, wherein said contact member is configured and arranged so as to come into contact with the wheel rim flange when said improper working position involves either one or both of an improper radial position or an improper axial position of said tire bead deflector relative to the wheel rim.

5. The apparatus according to claim 4, wherein said contact member is configured and arranged so that the contacting of said contact member onto the wheel rim flange in said improper axial position and in said improper radial position both cause an axial displacement motion of said contact member in said axial direction.

6. The apparatus according to claim 2, wherein said contact member includes an a first contact surface that extends from said tire bead deflector toward the wheel rim flange at an oblique angle relative to said axis.

7. The apparatus according to claim 6, wherein said contact member includes a second contact surface that extends perpendicular to said axis and adjoins said first contact surface.

8. The apparatus according to claim 7, wherein said tire bead deflector has an end surface that faces toward the wheel rim flange and that has a surface configuration matching said first and second contact surfaces of said contact member, wherein said surface configuration includes a first surface section that extends perpendicular to said axis and a second surface section that extends at an oblique angle relative to said axis.

9. The apparatus according to claim 2, wherein said tire bead deflector has an end surface that faces toward the wheel rim flange, and said contact member is arranged on said end surface.

10. The apparatus according to claim 9, wherein said end surface includes a first surface section that extends perpendicular to said axis and a second surface section that extends at an oblique angle relative to said axis.

11. The apparatus according to claim 2, wherein said signaling arrangement includes a wireless signal transmitter that is connected for signal transmission to said controller by a wireless transmission link and that is adapted to transmit said signal to said controller in a wireless manner.

12. The apparatus according to claim 11, wherein said signaling arrangement further includes a piezoelectric element as an energy source that is adapted to provide electrical energy to operate said wireless signal transmitter.

13. The apparatus according to claim 2, wherein said contact member is connected by a pushrod to said signaling arrangement so that a displacement of said contact member actuates said signaling arrangement via said pushrod.

14. The apparatus according to claim 2, wherein said signaling arrangement comprises a switching arrangement that is connected to and mechanically actuable by a displacement of said contact member, and an energy source that is connected to said switching arrangement to be adapted to selectively produce said signal.

15. The apparatus according to claim 14, wherein said energy source comprises a piezoelectric element adapted to generate an electrical pulse as said signal.

16. A method of mounting a tire on a wheel rim of a vehicle wheel, comprising the steps:
a) providing an apparatus for mounting a tire on a wheel rim of a vehicle wheel, said apparatus comprising:
a wheel rim support adapted to support the wheel rim;
a tire mounting head including a tire bead deflector adapted to deflect a tire bead of the tire around a wheel rim flange of the wheel rim, and a tire press-in roller adapted to press the tire bead into a rim well of the wheel rim;
a drive arrangement connected to said tire mounting head and adapted to drive said tire mounting head rotationally about a wheel rim axis of the wheel rim and axially toward and away from the wheel rim along the wheel rim axle; and
arranged on said tire mounting head, a detector arrangement adapted to delect an existence or non-existence of at least a prescribed minimum spacing distance between said tire bead deflector and the wheel rim, and signaling means for providing to said drive arrangement a signal that is responsive to said detecting and that influences the driving of said tire mounting head by said drive arrangement;
wherein said detector arrangement comprises a contact member configured and arranged on said tire bead deflector so as to come into contact with the wheel rim flange in the event of an improper working position of said tire bead deflector relative to the wheel rim, in which improper working position said tire bead deflector fails to maintian at least said prescribed minimum spacing distance between said tire bead deflector and the wheel rim; and
wherein said contact member protrudes by said prescribed minimum spacing distance from said tire bead deflector toward the wheel rim flange so as to be positioned to contact the wheel rim flange before any
part of said tire bead deflector contacts the wheel rim flange;
b) supporting and securely holding said wheel rim with said wheel rim support;
c) positioning said tire partly on said wheel rim;
d) using said drive arrangement, moving said tire mounting bead including said tire bead deflector axially toward said wheel rim.

17. The method according to claim 16, wherein said providing of said signal comprises wirelessly transmitting said signal from said signaling means to said drive arrangement that drives said moving and said rotating in said steps c) and d).

18. The method according to claim 16, wherein said detecting means comprises a contact member, wherein said signaling means comprises a piezoelectric element, wherein said monitoring in said step f) is performed with said contact member on said tire bead deflector that contacts said wheel rim if said actual spacing distance falls below said prescribed minimum spacing distance, and wherein said producing of said signal comprises mechanically actuating said piezoelectric element in response to a displacement of said contact member due to said contact thereof with said wheel rim so that said piezoelectric element produces electrical energy as said signal.

19. An apparatus for mounting a tire on a wheel rim of a vehicle wheel, comprising:
a wheel rim support adapted to support the wheel rim;
a tire bead deflector adapted to deflect a tire bead of the tire around a wheel rim flange of the wheel rim;
a drive arrangement connected to said tire bead deflector and adapted to drive said tire bead deflector rotationally about an axis and axially in an axial direction along or parallel to said axis toward and away from the wheel rim;
a controller connected to said drive arrangement and adapted to control an operation of said drive arrangement;
a contact member configured and arranged on said tire bead deflector so as to come into contact with the wheel rim flange in the event of an improper working position of said tire bead deflector relative to the wheel rim, in which improper working position said tire bead deflector fails to maintain at least a prescribed minimum spacing distance between said tire bead deflector and the wheel rim; and a signaling arrangement that is connected to said contact member so as to be actuated thereby, and that is connected for signal transmission to said controller, wherein said signaling arrangement is adapted to emit and provide to said controller a signal in response to said contact member coming into contact with the wheel rim, and said controller is adapted to control said drive arrangement in response to said signal;

wherein said tire bead deflector has an end surface that laces toward the wheel rim flange, and said contact member is arranged on said end surface; and wherein said end surface has a groove therein, and said contact member is movebly received partly recessed in said groove.

20. An apparatus for mounting a tire on a wheel rim of a vehicle wheel, comprising:

a wheel rim support adapted to support the wheel rim;

a tire mounting head including a tire bead deflector adapted to deflect a tire bead of the tire around a wheel rim flange of the wheel rim, and a tire press-in roller adapted to press the tire bead into a rim well of the wheel rim;

a drive arrangement connected to said tire mounting head and adapted to drive said tire mounting head rotationally about a wheel rim axis of the wheel rim and axially toward and away from the wheel rim along the wheel rim axis; and arranged on said tire mounting head, a detector arrangement adapted to detect an existence or non-existence of at least a prescribed minimum spacing distance between said tire bead deflector and the wheel rim, and signaling means for providing to said drive arrangement a signal that is responsive to said detecting and that influences the driving of said tire mounting head by said drive arrangement;

wherein said detector arrangement comprises a contact member configured and arranged on said tire bead deflector so as to come into contact with the wheel rim flange in the event of an improper working position of said tire bead deflector relative to the wheel rim, in which improper working position said tire bead deflector fails to maintain at least said prescribed minimum spacing distance between said tire bead deflector and the wheel rim;

wherein said tire bead deflector has an end surface that faces toward the wheel rim flange, and said contact member is arranged on said end surface; and wherein said end surface has a groove therein, and said contact member is movebly received partly recessed in said groove.

* * * * *

UNITED STATES PATENT AND TRADEMARK OFFICE
CERTIFICATE OF CORRECTION

PATENT NO. : 7,264,032 B2
APPLICATION NO. : 11/209481
DATED : September 4, 2007
INVENTOR(S) : Peinelt et al.

It is certified that error appears in the above-identified patent and that said Letters Patent is hereby corrected as shown below:

<u>Column 9,</u>
Line 58, after "rim", delete "a";
Line 63, after "tire", replace "pressin" by --press-in--;

<u>Column 10,</u>
Line 18, after "at", replace "lease" by --least--;
Line 58, after "rim", replace "flanges" by --flange--;

<u>Column 11,</u>
Line 10, after "includes", delete "an";
Line 48, after "mechanically", replace "actuable" by --actuatable--;

<u>Column 12,</u>
Line 2, after "rim", replace "axle" by --axis--;
Line 4, after "to", replace "delect" by --detect--;
Line 17, after "to", replace "maintian" by --maintain--;
Line 25, after "any", there is no paragraph break;
Line 32, after "ing", replace "bead" by --head--;
Line 33, after "rim", replace "." by --;--;

<u>Column 12,</u>
Following line 33, insert:
--e) using said drive arrangement, rotating said tire mounting head to rotate said tire bead deflector around said wheel rim flange of said wheel rim so that said tire bead deflector deflects said tire bead of said tire around said wheel rim flange;

f) pressing said tire bead into said rim well of said wheel rim using said tire press-in roller;

g) during said steps d) and e), using said detector arrangement, monitoring whether an actual spacing distance between said tire bead deflector and said wheel rim is at least equal to said prescribed minimum spacing distance;

UNITED STATES PATENT AND TRADEMARK OFFICE
CERTIFICATE OF CORRECTION

PATENT NO. : 7,264,032 B2 Page 2 of 2
APPLICATION NO. : 11/209481
DATED : September 4, 2007
INVENTOR(S) : Peinelt et al.

It is certified that error appears in the above-identified patent and that said Letters Patent is hereby corrected as shown below:

h)  if said actual spacing distance falls below said prescribed minimum spacing distance, then producing a signal using said signaling means and providing said signal to said drive arrangement; and i)  in response to said signal, influencing at least one of said moving in said step d) or said rotating in said step e).--;

Line 39, replace "c) and d)" by --d) and e)--;
Lines 40 and 41, delete "wherein said detecting means comprises a contact member,";
Line 43, after "step", replace "f)" by --g)--;

Column 13,
Line 15, after "bead", replace "deflcctor" by --deflector--;
Line 16, before "toward", replace "laces" by --faces--;
Line 19, after "member is", replace "movebly" by --movably--;

Column 14,
Line 27, after "is", replace "movebly" by --movably--.

Signed and Sealed this

Thirty-first Day of March, 2009

JOHN DOLL
*Acting Director of the United States Patent and Trademark Office*